Patented Aug. 11, 1936

2,050,923

UNITED STATES PATENT OFFICE 2,050,923

PROCESS FOR BREAKING PETROLEUM EMULSIONS

Melvin De Groote and Wilbur C. Adams, St. Louis, and Bernhard Keiser and Arthur F. Wirtel, Webster Groves, Mo., assignors to Tretolite Company, Webster Groves, Mo., a corporation of Missouri No Drawing. Application September 16, 1935, Serial No. 40,682

11 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water, when the emulsion is permitted to remain in a quiescent state after treatment, or is subjected to other equivalent separatory procedures.

The treating agent used in our process consists of a chemical compound characterized by the presence of at least two triricinolein residues, of the formula $(C_{17}H_{32})_3C_3H_5$, or residues from other similar hydroxylated fatty glycerides, as hereinafter described, and at least one oxalic acid residue of the formula $(COO)_2$, in the molecule. The oxalic acid residue may be derived by elimination of either one or both of the acidic hydrogens and may be either $(COO)_2$ or $HOOC.COO$. Obviously, in the latter form, the acidic hydrogen may be replaced by any equivalent, such as a metallic atom, an alkyl radical derived from a monohydric alcohol, such as $CH_3, C_2H_5, C_3H_7$ radicals, or by an amine addition product or residue derived by neutralization with a basic amine, such as triethanolamine, monoamylamine, etc. Said treating agent may be described in the most general manner as being of the type $(X)_m(T)_n$, in which X represents either the residue $(COO)_2$ or $Z.OOC.COO$, in which Z is an acidic hydrogen ion equivalent, $m$ designates the numeral one or more, T represents the residue $(C_{17}H_{32})_3C_3H_5$, and $n$ designates the numeral 2 or more. If there is a residual hydroxyl radical or radicals attached to T, then the formula becomes $(X)_m(T)_n(OH)_m$.

The hydroxylated glyceride most suitable for use in preparing the treating agent contemplated by our process, is commercial castor oil, which is technically pure triricinolein. Any triglyceride of a hydroxylated fatty acid may be employed, for instance, the glyceride of hydroxystearic acid. Obviously, castor oil could be halogenated so that the ethylene linkage would be saturated, while the alcoholiform hydroxyl radicals were unaffected, and such an altered triricinolein could be employed to produce our treating agent. Hydrogenated castor oil in which the alcoholiform hydroxyl is unaltered could be employed. Another raw material that may be used successfully in place of castor oil (triricinolein) is an oxidized or blown oil.

Certain available blown oils derived from non-hydroxylated glycerides contain hydroxyl groups. Reference is made to Southcombe, Chemistry of the Oil Industries, (1926), page 181, as follows:

"As with the polymerized and boiled oils, the exact nature of the change is unknown. Hydroxyl groups are unquestionably formed, as the considerable rise in acetyl value proves."

Such hydroxylated blown oils can be derived from various unsaturated oils, including rapeseed oil, marine oils, etc., particularly blown cottonseed oil and blown sardine oil. Since the blowing of these oils may produce other miscellaneous reactions in addition to the formation of the hydroxyl group, it is obvious that more complicated reactions may take place, and thus for practical purposes it is preferable to use castor oil as the raw material in the production of the treating agent used to practice our process.

U. S. Patent No. 1,976,602, dated October 9, 1934, to De Groote, Adams, and Keiser, discloses a process for resolving petroleum emulsions, in which the treating agent or demulsifying agent employed, is derived by reacting a polybasic acid with a hydroxylated fatty acid body. Our present process is similar to the process described in said De Groote, Adams and Keiser patent, in that it contemplates the use of a treating agent or demulsifying agent derived from the same general class of materials disclosed in said patent, but it is differentiated from the process of said Patent No. 1,976,602 by the use of a treating agent of specifically different composition, to wit, a treating agent that must contain more than one triglyceride residue in the molecule, and which must be derived solely from oxalic acid as the dibasic acid. In other words, although the patent previously referred to discloses a demulsifying agent produced by reacting a polybasic acid, not necessarily oxalic acid, with a hydroxylated fatty acid body, not necessarily a triglyceride, there is no specific disclosure in said patent of a demulsifying agent in which more than one triglyceride residue, for example, more than one triricinolein residue, is introduced into the molecule. We have found that a demulsifying agent of the specific composition above described is particularly effective in certain emulsions.

It is rather unlooked for that these particular compounds would be as effective as they happen to be on certain emulsions. Triricinolein has some demulsifying action. The introduction of one oxalic acid residue increases its demulsifying power enormously. There is further increase on the introduction of a second oxalic acid residue, and as a rule the introduction of three oxalic acid residues is also helpful. In other words, apparently the effectiveness increases as the ratio of oxalic acid residues to triricinolein residues increase. It is to be noted, however, that in the present compounds, the tendency is again to decrease the ratio of oxalic acid residues to triricinolein, and therefore the specific effectiveness on the number of emulsions of the compounds used in the present process is rather unusual.

The reagents employed in the present process are also related to the reagents employed in the process described in U. S. Patent No. 1,977,048, dated October 16, 1934, to De Groote and Roberts. The reagents employed in the present process, however, are additionally characterized by the fact that there is no direct linkage between the glyceryl radical and the oxalic acid residue. In said De Groote and Roberts patent, reagents may be obtained by reaction between one or more moles of triricinolein and one or more moles of oxalic acid and with the addition of glycerine, or by reaction between monoricinolein or diricinolein and oxalic acid; but in any event, there is a direct linkage between the glyceryl radical $C_3H_5$ and the oxalic acid residue. Such linkage is absent in the demulsifying agent employed in the present process. No claim is made that the reagents employed in the present process are either superior to or inferior to the reagents or demulsifying agents in said De Groote and Roberts patent. On some emulsions the reagents employed in the present process may be markedly superior to the reagents described in the De Groote and Roberts patent, whereas, in other cases the exact reverse may be true. The reagents employed in the present process are distinctly valuable because certain emulsions appear to be extremely susceptible to these particular reagents, and not nearly so susceptible to other available reagents.

For sake of simplicity, the reagents employed in the present process will be described by the reactions involving oxalic acid and castor oil, although as previously pointed out, other materials may be used in place of castor oil or triricinolein. Castor oil may be indicated by Formula A, which is as follows:

OH.R.COO.CH₂
OH.R.COO.CH
OH.R.COO.CH₂ in which R means the hydrocarbon chain $C_{17}H_{32}$. If one mole of triricinolein is reacted with one mole of oxalic acid so as to produce an acid ester, the material may be designated by Formula B, which is as follows:

COOH
COO.R.COO.CH₂
OH.R.COO.CH
OH.R.COO.CH

In passing, one might note that this material might have an additional isomeric form, which is also true with at least part of the subsequent formulas. It is not intended to differentiate between various isomeric forms. Similarly, if two moles of oxalic acid are reacted with one mole of triricinolein so as to involve only one acidic hydrogen of each oxalic acid mole, then the resultant product may be indicated by Formula C, as follows:

COO⁻
COO.R.COO.CH₂
OH.R.COO.CH
COO.R.COO.CH₂
COOH

Similarly, if three moles of oxalic acid are reacted in a similar manner, the product may be indicated by formula D, as follows:

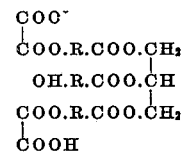

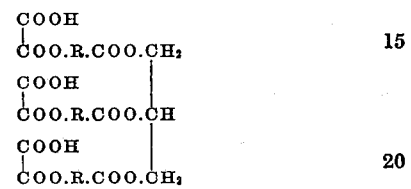

If oxalic acid is reacted so as to involve both of the acidic hydrogens, then one would obtain a material indicated by Formula E, which is "cyclic" in structure, the word "cyclic" being intended to indicate that there is present a closed chain and not an aromatic structure:

COO.R.COO.CH₂
COO.R.COO.CH
OH.R.COO.CH₂

Similarly, two moles of oxalic acid could react to give material of the type indicated in formula F, as follows:

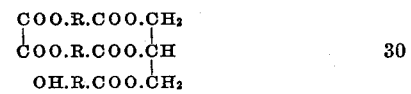

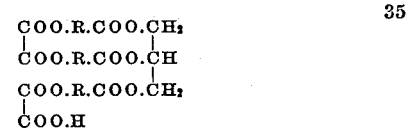

The preceding formulas of oxylated materials are characteristic of the type of material employed as a demulsifying agent in the De Groote, Adams and Keiser Patent No. 1,976,602, previously referred to.

The present applicants have discovered that if reagents of the type E and the type F are reacted together, one obtains an oxylated polytriricinolein body characterized by Formula G:

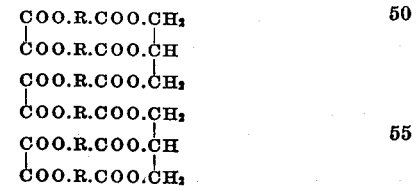

The reaction is a simple esterification, insofar that the material of the type E contains an alcoholiform hydroxyl, and the material of the type F contains an acidic hydrogen.

It is also obvious that material of the type indicated in Formula C may react with triricinolein (Formula A) so as to result in an oxylated polyricinolein body of the type indicated by Formula H:

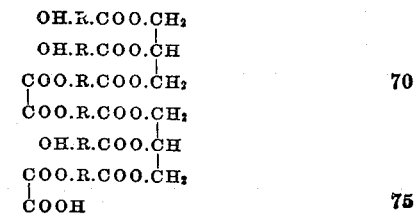

The type indicated in Formula H is differentiated principally from the type indicated by Formula G, in that type H contains an acidic hydrogen and also an alcoholiform hydroxyl. Thus, obviously, material of the type G may be combined with another mole of similar material having a single triricinolein residue, such as material of the types indicated by Formulas A, B, C, E, or F, to give a new compound characterized by the presence of three triricinolein residues. Similarly, the dehydration of material of the type H causes additional combinations, so that one obtains a body characterized by the presence of four triricinolein residues.

It has also been found that if a large excess of triricinolein is heated with a small amount of oxalic acid at slightly above 100° C., one may obtain, at least in part, material of the type indicated by Formula I:

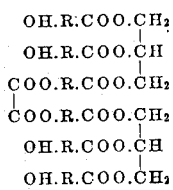

No further attempt will be made to elaborate on the possible formulas other than to point out that one may obtain a variety of material of the type $(X)_m(T)_n$, in which X represents either the residue $(COO)_2$ or $Z.OOC.COO$, in which Z is the acidic hydrogen ion equivalent, $m$ designates the numeral one or more, T represents the residue $(C_{17}H_{32})_3C_3H_5$, and $n$ designates the numeral 2 or more. Where there is an acidic hydrogen present, such acidic hydrogen can be replaced by a sodium atom, potassium atom, or two such acidic hydrogens may be replaced by a calcium atom, magnesium atom, etc. Such acidic hydrogen atom can also be replaced by an organic radical of the kind previously described, such as a methyl radical, ethyl radical, or an aryl or aralkyl radical. Insofar that the addition of a strong saponifying agent may decompose such esterified material, it is preferable to eliminate such acidic hydrogen, if one desires to eliminate it, by the addition of an amine such as monoamylamine, or preferably, by the addition of triethanolamine.

It is to be observed that the reagent obtained by the reactions involving oxalic acid and triricinolein or similar material, are always characterized by the absence of any direct linkage between the glyceryl radical $C_3H_5$ and the oxalic acid residue.

The treating agent or demulsifying agent employed in our process may be prepared by heating molecular proportions of material corresponding to Formula C with material corresponding to Formula B, or with triricinolein.

The presence of material containing oxylated monotriricinolein bodies is not objectionable, of course, because such materials are active demulsifying agents. If one desires, a very convenient method of preparing a mixture of various oxylated polyricinolein bodies is as follows:

To 1000 pounds of castor oil there is added 285 pounds of crystalline oxalic acid containing two moles of water of crystallization. The material is stirred thoroughly while heated to a temperature of 110° C. and dry carbon dioxide passed through the mixture, so as to carry off water of crystallization and water of esterification. The reaction is stopped when one obtains a mixture of the materials characterized by Formulas C and D. These materials represent the acidic di- and tri-oxylated triricinolein bodies, with possibly small amounts of the monooxylated material. When this reaction is complete, the temperature is raised to approximately 145° C., and temperature maintained for several hours until the final product represents a mixture of materials such as Formulas G, H and I. The materials in Formulas G, H and I are characterized by a molecular weight approximating 1850, and reaction is continued at 145° C. for approximately four hours or thereabouts, or until a molecular weight determination shows that the material is of the diricinolein type.

The solution of the material in benzol should show the absence of any free uncombined oxalic acid. Saponification of the material by means of potash yields potassium oxalate and potassium ricinoleate. The ratio of these materials shows the proportion in which they are combined in the final product. This may not be the same proportion in which they are added originally, because there may be some decomposition of oxalic acid during the heating process. There should be no free ricinolein, which, if present, can be extracted with a suitable solvent, such as 95% ethyl alcohol. The presence or absence of carboxyl or hydroxyl groups, together with the molecular weight and the ratio of ricinoleate to oxalate, will indicate the composition of the material rather specifically.

The above mixture should yield about 1150 pounds of finished material. The difference between this weight and the weight of raw material is explained by a loss of water of crystallization, water of esterification, and decomposition of oxalic acid or oxalic acid residues. Naturally, anhydrous oxalic acid may be used in place of oxalic acid containing water of crystallization, or the hydrated material may be dried in the usual manner before being employed in the reaction.

We have found that the most desirable type of reagent is one in which there is either a residual hydroxyl radical or a residual carboxyl radical, due to the presence of an HOOC COO residue or both. One may have compounds, of course, in which there are two hydroxyl radicals or two carboxylic radicals present. The most effective reagents are also characterized by the introduction of two oxalic acid residues or three oxalic residues into a molecule characterized by the presence of two $C_{17}H_{32}$ residues. However, the presence of four oxalic acid residues in a molecule containing two $C_{17}H_{32}$ residues yields an equally effective reagent, but shows no particular advantage in most instances and is more expensive, because the cost of anhydrous oxalic acid begins to approximate almost twice the cost of castor oil.

The materials previously described need not be employed alone, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, oxylated monotriricinolein bodies, phthlated ricinolein bodies, blown castor oil, etc., or the salts and/or esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, etc.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type, a ratio of 1 part of treating agent to 10,000 parts of emulsion will usually be found to produce commercially satisfactory results.

The reagents employed in the present process as a rule show rather a limited solubility in either oil or water, and some of them may be classed as oil and water insoluble in the usual sense of the word "insoluble". It has been pointed out that these reagents may be employed in a ratio of 1–20,000, and it is quite possible that some of these so-called "insoluble" types are really soluble when employed in such minute ratio. Some types exhibit distinct oil solubility at ratios of 1–100 or 1–1,000. Other types exhibit distinct water solubility in the same ratio. This is especially true of those types which have one or more carboxyl residues, neutralized with tri-ethanolamine or the like. Some compounds show both oil and water solubility. In some instances, of course, the compounds are employed in admixture with other reagents and the solubility of the mixture is dependent largely upon the other ingredients present. Some of the most insoluble types of reagents employed in the present process give the best results when introduced into emulsion in minute amounts by means of a pump or any other conventional means.

Having thus described our invention, what we claim as new and desire to secure by Letters Patent is:

1. A process for breaking petroleum emulsions of the water-in-oil type, which consists in subjecting the emulsion to the action of a demulsifying agent containing a chemical compound characterized by the presence in the molecule of at least one oxalic acid residue and at least two triglyceride residues, derived from a hydroxylated fatty acid glyceride, and further characterized by the absence of a direct linkage between any glyceryl radical and any oxalic acid residue.

2. A process for breaking petroleum emulsions of the water-in-oil type, which consists in subjecting the emulsion to the action of a demulsifying agent containing a chemical compound characterized by the presence in the molecule of at least one oxalic acid residue and at least two triglyceride residues and not more than four triglyceride residues, derived from a hydroxylated fatty acid glyceride, and further characterized by the absence of a direct linkage between any glyceryl radical and any oxalic acid residue.

3. A process for breaking petroleum emulsions of the water-in-oil type, which consists in subjecting the emulsion to the action of a demulsifying agent containing a chemical compound characterized by the presence in the molecule of at least one oxalic acid residue, at least two $C_{17}H_{32}$ and not more than four $C_{17}H_{32}$ residues, derived from triricinolein, and further characterized by the absence of a direct linkage between any glyceryl radical and any oxalic acid residue.

4. A process for breaking petroleum emulsions of the water-in-oil type, which consists in subjecting the emulsion to the action of a demulsifying agent containing a chemical compound characterized by the presence in the molecule of at least one oxalic acid residue and not more than four oxalic acid residues, and at least two $C_{17}H_{32}$ and not more than four $C_{17}H_{32}$ residues, derived from triricinolein, and further characterized by the absence of a direct linkage between any glyceryl radical and any oxalic acid residue.

5. A process for breaking petroleum emulsions of the water-in-oil type, which consists in subjecting the emulsion to the action of a demulsifying agent containing a chemical compound characterized by the presence in the molecule of one oxalic acid residue and two $C_{17}H_{32}$ residues, derived from triricinolein, and further characterized by the absence of a direct linkage between any glyceryl radical and the oxalic acid residue.

6. A process for breaking petroleum emulsions of the water-in-oil type, which consists in subjecting the emulsion to the action of a demulsifying agent containing a chemical compound characterized by the presence in the molecule of two oxalic acid residues and two $C_{17}H_{32}$ residues, derived from triricinolein, and further characterized by the absence of a direct linkage between any glyceryl radical and any oxalic acid residue.

7. A process for breaking petroleum emulsions of the water-in-oil-type, which consists in subjecting the emulsion to the action of a demulsifying agent containing a chemical compound characterized by the presence in the molecule of three oxalic acid residues and two $C_{17}H_{32}$ residues, derived from triricinolein, and further characterized by the absence of a direct linkage between any glyceryl radical and any oxalic acid residue.

8. A process for breaking petroleum emulsions of the water-in-oil type, which consists in subjecting the emulsion to the action of a demulsifying agent containing a chemical compound characterized by the presence in the molecule of three oxalic acid residues and two $C_{17}H_{32}$ residues, derived from triricinolein, and further characterized by the absence of a direct linkage between any glyceryl radical and any oxalic acid residue, and additionally characterized by the presence of a hydroxyl radical in the molecule.

9. A process for breaking petroleum emulsions of the water-in-oil type, which consists in subjecting the emulsion to the action of a demulsifying agent containing a chemical compound characterized by the presence in the molecule of two oxalic acid residues and two $C_{17}H_{32}$ residues, derived from triricinolein, and further characterized by the absence of a direct linkage between any glyceryl radical and any oxalic acid residue, and additionally characterized by the presence of a carboxyl radical in the molecule.

10. A process for breaking petroleum emulsions of the water-in-oil type, which consists in subjecting the emulsion to the action of a demulsifying agent containing a chemical compound characterized by the presence in the molecule of three oxalic acid residues and two $C_{17}H_{32}$ residues, derived from triricinolein, and further characterized by the absence of a direct linkage between any glyceryl radical and any oxalic acid radical, and additionally characterized by the presence of a carboxyl radical in the molecule.

11. A process for breaking petroleum emulsions of the water-in-oil type, which consists in subjecting the emulsion to the action of a demulsifying agent obtained by adding approximately 28½% of oxalic acid containing water of crystallization to castor oil and heating the same at approximately 105–110° C. until thoroughly dehydrated, and then subsequently heating at a temperature of approximately 145° C. until the reagent represents a weight equivalent to 15% in excess of the weight of the original castor oil.

MELVIN DE GROOTE.
WILBUR C. ADAMS.
BERNHARD KEISER.
ARTHUR F. WIRTEL.